(12) United States Patent
Liu et al.

(10) Patent No.: US 10,893,482 B2
(45) Date of Patent: Jan. 12, 2021

(54) SELECTION OF MODE AND DATA RANGE IN DEVICE-TO-DEVICE CLOSE FIELD COMMUNICATION

(71) Applicant: Apple Inc., Cupertino, CA (US)

(72) Inventors: Yong Liu, Campbell, CA (US); Christiaan A. Hartman, Mountain View, CA (US); Jarkko L. Kneckt, Los Gatos, CA (US); Su Khiong Yong, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/550,640

(22) Filed: Aug. 26, 2019

(65) Prior Publication Data
US 2020/0100189 A1    Mar. 26, 2020

(51) Int. Cl.
| | |
|---|---|
| *H04W 52/04* | (2009.01) |
| *H04W 4/80* | (2018.01) |
| *H04W 52/24* | (2009.01) |
| *H04W 8/00* | (2009.01) |
| *H04W 84/12* | (2009.01) |

(52) U.S. Cl.
CPC .......... *H04W 52/243* (2013.01); *H04W 4/80* (2018.02); *H04W 8/005* (2013.01); *H04W 84/12* (2013.01)

(58) Field of Classification Search
CPC ... H04W 4/80; H04W 52/146; H04W 52/243; H04W 52/265; H04W 52/267; H04W 52/327; H04W 52/367; H04W 52/383; H04W 52/50; H04W 84/12; H04W 8/005

USPC .............................. 455/522, 41.1, 41.2, 41.3
See application file for complete search history.

(56) References Cited

U.S. PATENT DOCUMENTS

| | | | |
|---|---|---|---|
| 9,456,372 B2 | 9/2016 | Lee | |
| 9,693,338 B2 | 6/2017 | Zhao | |
| 2008/0316052 A1* | 12/2008 | Ruffini | H04W 52/267 340/901 |
| 2016/0029429 A1* | 1/2016 | Peng | H04W 24/02 370/329 |
| 2017/0331670 A1 | 11/2017 | Parkvall | |

* cited by examiner

*Primary Examiner* — Philip Sobutka
(74) *Attorney, Agent, or Firm* — Kowert, Hood, Munyon, Rankin & Goetzel, P.C.

(57) ABSTRACT

Wireless stations may operate to configure direct communication with neighboring wireless stations (direct communication between wireless stations without an intermediate access point). Mechanisms for near-field device-to-device communications are disclosed. A wireless station may be configured to determine a minimum power level for a near-field device-to-device datapath. The wireless device may determine an average channel interference for a first discovery channel and compare the average channel interference to a first threshold. If the average channel interference is less than the first threshold, the wireless device may select a first transmission mode associated with a first power level and determine a maximum data rate for the first transmission mode. If the maximum data rate at least meets a quality of service requirements for a device-to-device transmission with a neighboring wireless device, the wireless device may perform device-to-device transmissions with the neighboring wireless device using the first transmission mode.

20 Claims, 13 Drawing Sheets

| Field | Size (Octets) | Description |
|---|---|---|
| FC | 2 | Frame Control field |
| Duration | 2 | Duration value for the beacon frame |
| A1 | 6 | Broadcast Address |
| A2 | 6 | Transmitter MAC address |
| A3 | 6 | Cluster ID identifying the NAN cluster |
| Seq. Ctrl | 2 | Sequence Control field |
| Time Stamp | 8 | Time Stamp of the beacon frame |
| Beacon Interval | 2 | Time units between beacons |
| Capability | 2 | Capability information field |
| NAN IE | Variable | NAN information element |
| FCS | 4 | Frame checksum |

FIG. 4A

| Field | Size | Description |
|---|---|---|
| Category | 1 | IEEE 802.11 public action frame (PAF) or protected dual of PAF |
| Action | 1 | IEEE 802.1 PAF vendor specific |
| OUI | 3 | Wi-Fi Alliance specific OUI |
| OUI Type | 1 | Identifying type and version of NAN |
| NAN attributes | Variable | One or more NAN attributes |

FIG. 4B

| Attributes | NAN SDF Frames ||||| 
|---|---|---|---|---|---|
| | Publish ||| Subscribe | Follow-up |
| | Data | Ranging | Otherwise | | |
| Master Indication | NO | NO | NO | NO | NO |
| Cluster | NO | NO | NO | NO | NO |
| Service ID List | NO | NO | NO | NO | NO |
| Service Descriptor | YES/M | YES/M | YES/M | YES/M | YES/M |
| NAN Con. Cap. | YES/O | YES/O | YES/O | YES/O | YES/O |
| WLAN Infra | YES/O | YES/O | YES/O | YES/O | YES/O |
| P2P Operation | YES/O | YES/O | YES/O | YES/O | YES/O |
| IBSS | YES/O | YES/O | YES/O | YES/O | YES/O |
| Mesh | YES/O | YES/O | YES/O | YES/O | YES/O |
| Further Service Dis | YES/O | YES/O | YES/O | YES/O | YES/O |
| Further Avail Map | YES/O | YES/O | YES/O | YES/O | YES/O |
| Country Code | YES/O | YES/O | YES/O | YES/O | YES/O |
| Ranging | YES/O | YES/O | YES/O | YES/O | YES/O |
| Cluster Discovery | NO | NO | NO | NO | NO |
| Service Desc. Ext | YES/M | YES/M | YES/O | YES/O | YES/O |
| Device Cap. | YES/M | YES/M | YES/O | YES/O | YES/O |
| NDP | NO | NO | NO | NO | NO |
| NAN Availability | YES/M | YES/M | YES/O | YES/O | YES/O |
| NDC | YES/O | YES/O | YES/O | YES/O | YES/O |
| NDL | NO | NO | NO | NO | NO |
| NDL QoS | NO | NO | NO | NO | NO |
| Unaligned Sched. | YES/O | YES/O | YES/O | YES/O | YES/O |
| Ranging Info. | NO | YES/M | NO | NO | YES/O |
| Ranging Setup | NO | NO | NO | NO | NO |
| FTM Rang. Rep. | NO | NO | NO | NO | NO |
| Element Container | YES/O | YES/O | YES/O | YES/O | YES/O |
| Ex. WLAN Infra. | YES/O | YES/O | YES/O | YES/O | YES/O |
| Ex. P2P Operation | YES/O | YES/O | YES/O | YES/O | YES/O |
| Ex. IBSS | YES/O | YES/O | YES/O | YES/O | YES/O |
| Ex. Mesh | YES/O | YES/O | YES/O | YES/O | YES/O |
| Cipher Suit Info. | YES/O | YES/O | YES/O | YES/O | YES/O |
| Security Con. Info. | YES/O | YES/O | YES/O | YES/O | YES/O |
| Shared-Key Desc. | NO | NO | NO | NO | NO |
| Public Availability | YES/O | YES/O | YES/O | YES/O | YES/O |
| Vendor Specific | YES/O | YES/O | YES/O | YES/O | YES/O |

*FIG. 4C*

| Field | Size | Description |
|---|---|---|
| Category | 1 | IEEE 802.11 public action frame (PAF) or protected dual of PAF |
| Action | 1 | IEEE 802.1 PAF vendor specific |
| OUI | 3 | Wi-Fi Alliance specific OUI |
| OUI Type | 1 | Identifying type and version of NAN |
| OUI Subtype | 1 | Identifying type of NAN action frame |
| Information Content | variable | Fields and/or attributes for specific NAN action frames |

| TX Power [dBm] | Path Loss [dB] | Maximum Interference [dBm] | SNR [dB] |
|---|---|---|---|
| 0 | 40-47 | -62 | 15-22 |
| 5 | 40-47 | -67 | 25-32 |

FIG. 7B

| VHT MCS | MOD | CODE | 20 MHz DATA RATE [Mbps] 800 ns | 20 MHz DATA RATE [Mbps] 400 ns | SNR [dB] | RSSI | 40 MHz DATA RATE [Mbps] 800 ns | 40 MHz DATA RATE [Mbps] 400 ns | SNR [dB] | RSSI | 80 MHz DATA RATE [Mbps] 800 ns | 80 MHz DATA RATE [Mbps] 400 ns | SNR [dB] | RSSI |
|---|---|---|---|---|---|---|---|---|---|---|---|---|---|---|
| | | | | | | | 1 Spatial Stream | | | | | | | |
| 0 | BPSK | 1/2 | 6.5 | 7.2 | 2 | -82 | 13.5 | 15 | 5 | -79 | 29.3 | 32.5 | 8 | -76 |
| 1 | QPSK | 1/2 | 13 | 14.4 | 5 | -79 | 27 | 30 | 8 | -76 | 58.5 | 65 | 11 | -73 |
| 2 | QPSK | 3/4 | 19.5 | 21.7 | 9 | -77 | 40.5 | 45 | 12 | -74 | 87.8 | 97.5 | 15 | -71 |
| 3 | 16-QAM | 1/2 | 26 | 28.9 | 11 | -74 | 54 | 60 | 14 | -71 | 117 | 130 | 17 | -68 |
| 4 | 16-QAM | 3/4 | 39 | 43.3 | 15 | -70 | 81 | 90 | 18 | -67 | 175.5 | 195 | 21 | -64 |
| 5 | 64-QAM | 2/3 | 52 | 57.8 | 18 | -66 | 108 | 120 | 21 | -63 | 234 | 260 | 24 | -60 |
| 6 | 64-QAM | 3/4 | 58.5 | 65 | 20 | -65 | 121.5 | 135 | 23 | -62 | 263.3 | 292.5 | 26 | -59 |
| 7 | 64-QAM | 5/6 | 65 | 72.2 | 25 | -64 | 135 | 150 | 28 | -61 | 292.5 | 325 | 31 | -58 |
| 8 | 256-QAM | 3/4 | 78 | 86.7 | 29 | -59 | 162 | 180 | 32 | -56 | 351 | 390 | 35 | -53 |
| 9 | 256-QAM | 5/6 | | | 31 | -57 | 180 | 200 | 34 | -54 | 390 | 433.3 | 37 | -51 |
| | | | | | | | 2 Spatial Streams | | | | | | | |
| 0 | BPSK | 1/2 | 13 | 14.4 | 2 | -82 | 27 | 30 | 5 | -79 | 58.5 | 65 | 8 | -76 |
| 1 | QPSK | 1/2 | 26 | 28.9 | 5 | -79 | 54 | 60 | 8 | -76 | 117 | 130 | 11 | -73 |
| 2 | QPSK | 3/4 | 39 | 43.3 | 9 | -77 | 81 | 90 | 12 | -74 | 175.5 | 195 | 15 | -71 |
| 3 | 16-QAM | 1/2 | 52 | 57.8 | 11 | -74 | 108 | 120 | 14 | -71 | 234 | 260 | 17 | -68 |
| 4 | 16-QAM | 3/4 | 78 | 86.7 | 15 | -70 | 162 | 180 | 18 | -67 | 351 | 390 | 21 | -64 |
| 5 | 64-QAM | 2/3 | 104 | 115.6 | 18 | -66 | 216 | 240 | 21 | -63 | 468 | 520 | 24 | -60 |
| 6 | 64-QAM | 3/4 | 117 | 130.3 | 20 | -65 | 243 | 270 | 23 | -62 | 526.5 | 585 | 26 | -59 |
| 7 | 64-QAM | 5/6 | 130 | 144.4 | 25 | -64 | 270 | 300 | 28 | -61 | 585 | 650 | 31 | -58 |
| 8 | 256-QAM | 3/4 | 156 | 173.3 | 29 | -59 | 324 | 360 | 32 | -56 | 702 | 780 | 35 | -53 |
| 9 | 256-QAM | 5/6 | | | 31 | -57 | 360 | 400 | 34 | -54 | 780 | 866.7 | 37 | -51 |

| TX Mode | TX Power [dBm] | CCA Threshold (PD) [dBm] |
|---|---|---|
| CFC LP TX Mode | 0 | -62 |
| CFC MP TX Mode | 5 | -67 |
| CFC HP TX Mode | 10 | -72 |
| Normal TX Mode | 15-23 | -82 |

*FIG. 7C*

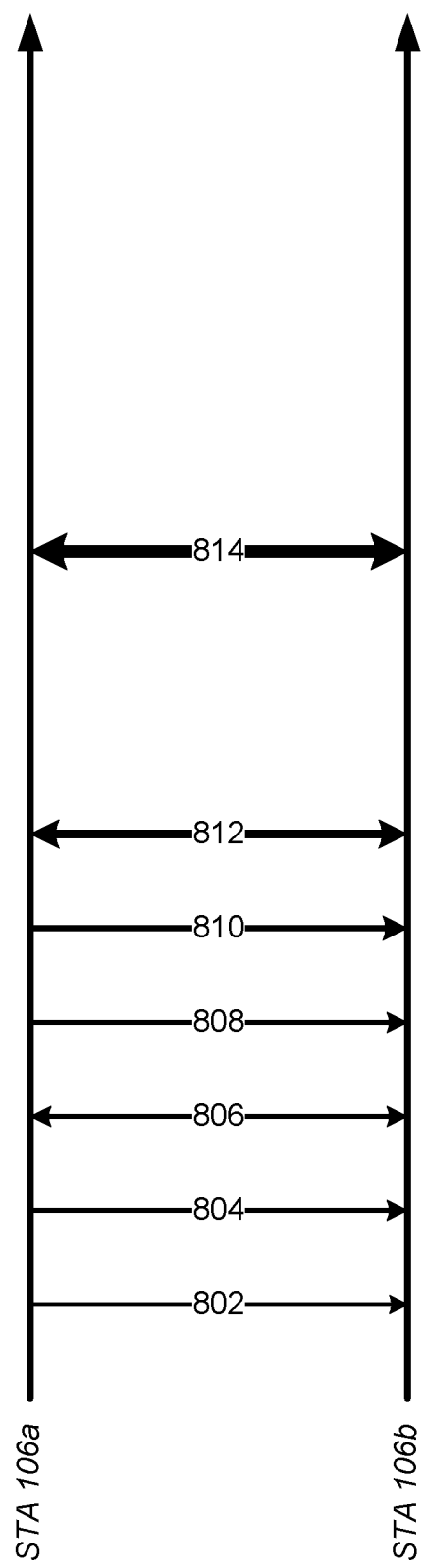

SELECTION OF MODE AND DATA RANGE IN DEVICE-TO-DEVICE CLOSE FIELD COMMUNICATION

PRIORITY DATA

This application is the National Stage of International Application No. 62/735,082, titled "Wi-Fi Device-to-Device Close Field Communication", filed Sep. 22, 2018, by Yong Liu, Christiaan A. Hartman, Jarkko L. Kneckt, and Su Khiong Yong, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems, Wi-Fi mobile stations are able to communicate directly with each other without using an intermediate access point. However, improvements in the operation of such devices are desired, such as in setup and coordination of the communication between such devices.

SUMMARY

Some embodiments described herein relate to systems and methods for peer wireless stations (e.g., wireless stations configured to communicate with neighboring wireless stations without utilizing an intermediate access point) to perform Wi-Fi device-to-device (or peer-to-peer) close (or near) field communication.

Some embodiments relate to a wireless station that includes one or more antennas, one or more radios, and one or more processors coupled (directly or indirectly) to the radios. At least one radio is configured to perform Wi-Fi communications, e.g., via a Wi-Fi interface. The wireless station may perform voice and/or data communications, as well as any or all of the methods described herein.

In some embodiments, one or more wireless stations operate to configure direct communication with neighboring mobile stations, e.g., direct communication between the wireless stations without utilizing an intermediate access point. Embodiments of the disclosure relate to a mechanism for peer devices to Wi-Fi close field communications.

In some embodiments, the communications may be performed via a peer-to-peer wireless communications protocol such as Neighbor Awareness Networking (NAN). Thus, embodiments of the disclosure also relate to NAN devices performing close field communication via respective NAN interfaces.

In some embodiments, a wireless station may be configured to perform a method to determine a minimum power level for a close (or near) field device-to-device datapath. In some embodiments, the method may include the wireless device determining an average channel interference for a first discovery channel and comparing the average channel interference to a first threshold. In some embodiments, if the average channel interference is less than the first threshold, the method may include the wireless device selecting a first transmission mode associated with a first power level and determining a maximum data rate for the first transmission mode. In some embodiments, if the maximum data rate at least meets a quality of service requirements for a device-to-device transmission with a neighboring wireless device, the method may include the wireless device performing device-to-device transmissions with the neighboring wireless device using the first transmission mode. In some embodiments, if the maximum data rate does not meet the quality of service requirements, the method may include the wireless device comparing the average channel interference to a second threshold. In some embodiments, if the average channel interference is less than the second threshold, the method may include the wireless device selecting a second transmission mode associated with a second power level. In some embodiments, the second power level may be greater than the first power level and the device-to-device transmissions may be performed using the second transmission mode.

In some embodiments, a wireless station may be configured to perform a method to determine a minimum power level for a close (or near) field device-to-device datapath that may include the wireless station determining an average channel interference for a first discovery channel. Further, in response to determining that the average channel interference is less than a first threshold, the method may include the wireless station selecting a first transmission mode associated with a first power level and determining a maximum data rate for the first transmission mode. Additionally, when the maximum data rate satisfies a quality of service requirement for a device-to-device transmission with a neighboring wireless device, the method may include the wireless station performing a device-to-device transmission with the neighboring wireless device using the first transmission mode. Additionally, in some embodiments, when the maximum data rate does not satisfy the quality of service requirement, the method may include the wireless station comparing the average channel interference to a second threshold and selecting, when the average channel interference satisfies the second threshold, a second transmission mode associated with a second power level. In some embodiments, the second power level may be greater than the first power level and the device-to-device transmissions may be performed using the second transmission mode.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 4A illustrates an example format of a synchronization/discovery beacon frame, according to some embodiments.

FIG. 4B illustrates an example format of a service discovery frame (SDF), according to some embodiments.

FIG. 4C illustrates an example format of a NAN attribute field, according to some embodiments.

FIG. 4D illustrates an example format of an action frame, according to some embodiments.

FIGS. 7A-B illustrate an example of transmit power levels and associated data rates for near-field communications, according to some embodiments.

FIG. 7C illustrates an example of possible transmit power levels for near-field communications, according to some embodiments.

FIG. 8 illustrates an example of signaling between devices for accelerated near-field communication assessment, according to some embodiments.

Figure 1:
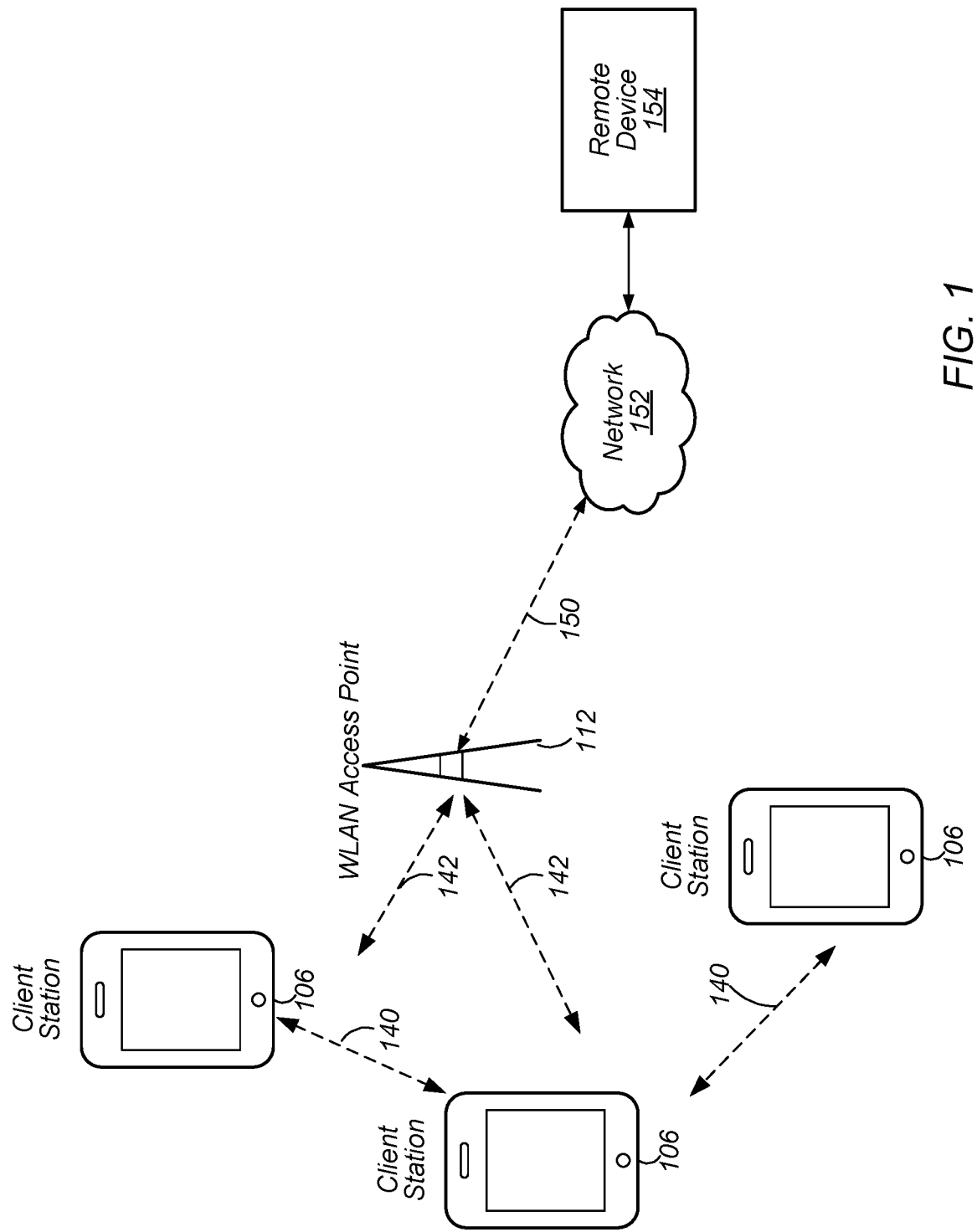
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
SInf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™) portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

WI-FI—The term "WI-FI" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "WI-FI". A WI-FI (WLAN) network is different from a cellular network.

BLUETOOTH™—The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (e.g., meaning having the potential to), rather than the mandatory sense (e.g., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods to determine a minimum (or reduced) power level for a close (or near) field device-to-device datapath. In some embodiments, the method may include the wireless device 106 determining an average channel interference for a first discovery channel and comparing the average channel interference to a first threshold. In some embodiments, if the average channel interference is less than the first threshold, the method may include the wireless device 106 selecting a first transmission mode associated with a first power level and determining a maximum data rate for the first transmission mode. In some embodiments, if the maximum data rate at least meets a quality of service requirement(s) for a device-to-device transmission with a neighboring wireless device 106, the method may include the wireless device 106 performing device-to-device transmissions with the neighboring wireless device 106 using the first transmission mode. In some embodiments, if the maximum data rate does not meet the quality of service requirements, the method may include the wireless device 106 comparing the average channel interference to a second threshold. In some embodiments, if the average channel interference is less than the second threshold, the method may include the wireless device 106 selecting a second transmission mode associated with a second power level. In some embodiments, the second power level may be greater than the first power level and the device-to-device transmissions may be performed using the second transmission mode.

In some embodiments, a wireless device 106 may be configured to perform a method to determine a minimum power level for a close (or near) field device-to-device datapath that may include the wireless device 106 determining an average channel interference for a first discovery channel. Further, in response to determining that the average channel interference is less than a first threshold, the method may include the wireless device 106 selecting a first transmission mode associated with a first power level and determining a maximum data rate for the first transmission mode. Additionally, when the maximum data rate satisfies a quality of service requirement for a device-to-device transmission with a neighboring wireless device, the method may include the wireless device 106 performing a device-to-device transmission with the neighboring wireless device using the first transmission mode. Additionally, in some embodiments, when the maximum data rate does not satisfy the quality of service requirement, the method may include the wireless device 106 comparing the average channel interference to a second threshold and selecting, when the average channel interference satisfies the second threshold, a second transmission mode associated with a second power level. In some embodiments, the second power level may be greater than the first power level and the device-to-device transmissions may be performed using the second transmission mode.

Figure 2:
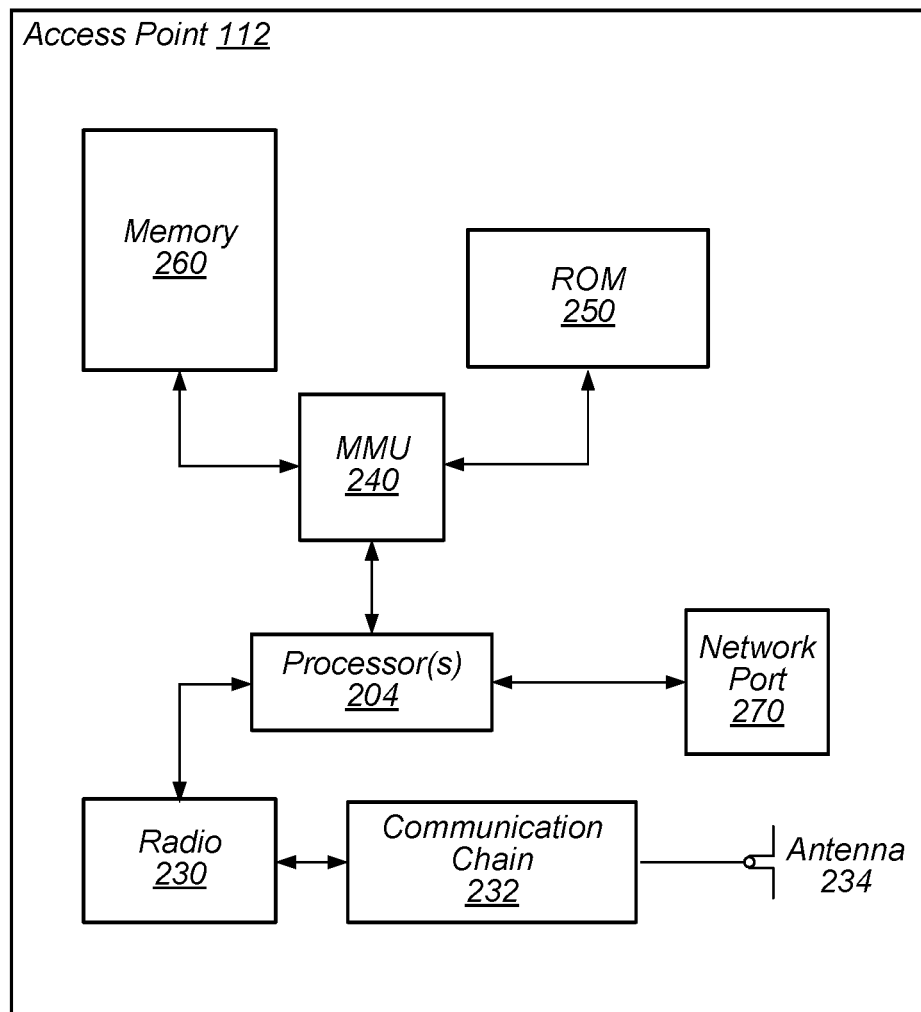
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods to determine a minimum (or reduced) power level for a close (or near) field device-to-device datapath. In some embodiments, the method may include the AP 112 determining an average channel interference for a first discovery channel and comparing the average channel interference to a first threshold. In some embodiments, if the average channel interference is less than the first threshold, the method may include the AP 112 selecting a first transmission mode associated with a first power level and determining a maximum data rate for the first transmission mode. In some embodiments, if the maximum data rate at least meets a quality of service requirement(s) for a device-to-device transmission with a neighboring wireless device, the method may include the AP 112 performing device-to-device transmissions with the neighboring wireless device using the first transmission mode. In some embodiments, if the maximum data rate does not meet the quality of service requirement(s), the method may include the AP 112 comparing the average channel interference to a second threshold. In some embodiments, if the average channel interference is less than the second threshold, the method may include the AP 112 selecting a second transmission mode associated with a second power level. In some embodiments, the second power level may be greater than the first power level and the device-to-device transmissions may be performed using the second transmission mode.

In some embodiments, an AP 112 may be configured to perform a method to determine a minimum (or reduced) power level for a close (or near) field device-to-device datapath that may include the AP 112 determining an average channel interference for a first discovery channel. Further, in response to determining that the average channel interference is less than a first threshold, the method may include the AP 112 selecting a first transmission mode associated with a first power level and determining a maximum data rate for the first transmission mode. Additionally, when the maximum data rate satisfies a quality of service requirement for a device-to-device transmission with a neighboring wireless device, the method may include the AP 112 performing a device-to-device transmission with the neighboring wireless device using the first transmission mode. Additionally, in some embodiments, when the maximum data rate does not satisfy the quality of service requirement, the method may include the AP 112 comparing the average channel interference to a second threshold and selecting, when the average channel interference satisfies the second threshold, a second transmission mode associated with a second power level. In some embodiments, the second power level may be greater than the first power level and the device-to-device transmissions may be performed using the second transmission mode.

Figure 3:
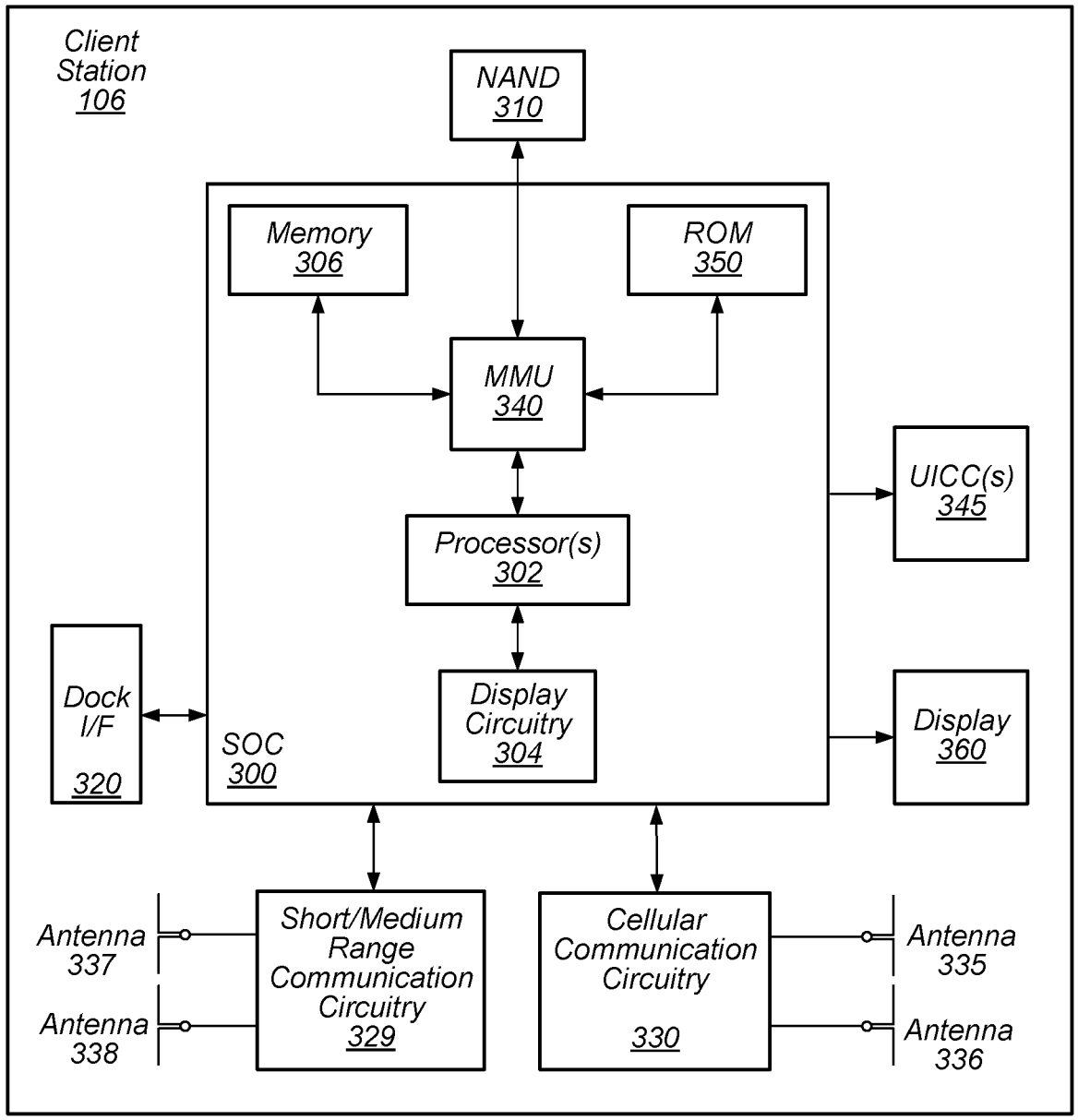
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods to determine a minimum power level for a close (or near) field device-to-device datapath. In some embodiments, the method may include the client station 106 determining an average channel interference for a first discovery channel and comparing the average channel interference to a first threshold. In some embodiments, if the average channel interference is less than the first threshold, the method may include the client station 106 selecting a first transmission mode associated with a first power level and determining a maximum data rate for the first transmission mode. In some embodiments, if the maximum data rate at least meets a quality of service requirements for a device-to-device transmission with a neighboring client station 106, the method may include the client station 106 performing device-to-device transmissions with the neighboring client station 106 using the first transmission mode. In some embodiments, if the maximum data rate does not meet the quality of service requirements, the method may include the client station 106 comparing the average channel interference to a second threshold. In some embodiments, if the average channel interference is less than the second threshold, the method may include the client station 106 selecting a second transmission mode associated with a second power level. In some embodiments, the second power level may be greater than the first power level and the device-to-device transmissions may be performed using the second transmission mode.

In some embodiments, a client station 106 may be configured to perform a method to determine a minimum (or reduced) power level for a close (or near) field device-to-device datapath that may include the client station 106 determining an average channel interference for a first discovery channel. Further, in response to determining that the average channel interference is less than a first threshold, the method may include the client station 106 selecting a first transmission mode associated with a first power level and determining a maximum data rate for the first transmission mode. Additionally, when the maximum data rate satisfies a quality of service requirement for a device-to-device transmission with a neighboring client station, the method may include the client station 106 performing a device-to-device transmission with the neighboring client station using the first transmission mode. Additionally, in some embodiments, when the maximum data rate does not satisfy the quality of service requirement, the method may include the wireless station 106 comparing the average channel interference to a second threshold and selecting, when the average channel interference satisfies the second threshold, a second transmission mode associated with a second power level. In some embodiments, the second power level may be greater than the first power level and the device-to-device transmissions may be performed using the second transmission mode.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Peer-to-Peer Frame Formats

In some embodiments, Wi-Fi devices (e.g., client station 106) may be able to communicate with each other in a peer to peer manner, e.g., without the communications going through an intervening access point. In some embodiments, devices may exchange one or more management frames, e.g., such as synchronization/discovery beacon frames, service discovery frames (SDFs), and/or action frames, in order to synchronize, advertise, solicit, and/or negotiate a peer-to-peer data session, such as a NAN datapath and/or a NAN datalink. In some embodiments, particular management frame formats (e.g., synchronization/discovery beacon frame formats, SDF formats, and/or action frame formats) may be implemented to transport information associated with embodiments disclosed herein.

For example, as illustrated by FIG. 4A, a synchronization/discovery beacon frame format (e.g., as specified by NAN 2.0 and later versions of NAN) may include fields such as a frame control (FC) field, a duration field, multiple address fields (e.g., A1-A3), a sequence control field, a time stamp field, a beacon interval field, a capability information field, a NAN information element (IE) field, and/or a frame checksum (FCS) field. The frame control field, duration field, sequence control field, time stamp field, beacon interval field, capability field, and/or FCS field may be defined by IEEE 802.11. Note that for synchronization beacons, the beacon interval field may be set to 512 TUs, which may correspond to a time interval between consecutive starts of discovery windows. In addition, for discovery beacons, the beacon interval field may be set to 100 TUs, which may correspond to an average time between consecutive discovery beacon transmissions by a device in a master (or primary) role. Addresses may include a broadcast address (A1), a transmitter medium access control (MAC) address (A2), and a cluster identifier address (A3). In some embodiments, the NAN IE may be vendor specific and may be configured to transport information associated with embodiments disclosed herein.

As another example, as illustrated by FIG. 4B, a service discovery frame format (e.g., as specified by NAN 2.0 and later versions of NAN) may include one or more fields, including a category field, an action field, an organizationally unique identifier (OUI) field, an OUI type field, and/or a NAN attributes field. In some embodiments, information associated with embodiments disclosed herein may be transported via the NAN attributes field. In some embodiments, information associated with embodiments disclosed herein may be transported via the OUI field and/or the OUI type field.

Further, as illustrated by FIG. 4C, the NAN attribute field (e.g., as specified by NAN 2.0 and later versions of NAN) includes multiple fields that may be used to implement features of embodiments disclosed herein. For example, in some embodiments, information associated with embodiments disclosed herein may be transported via any of (or any combination of) the attributes included in the NAN attribute field. For example, in some embodiments, the vendor specific attribute may be used to transport information associated with embodiments disclosed herein. As another example, the further availability map attribute may be used to transport information associated with embodiments disclosed herein. As shown, the NAN attribute field may contain (or include) different attributes based on a type of NAN SDF frame implemented. For example, a publish SDF frame for data transmission may include both mandatory (M) and optional (O) attributes that differ from a publish SDF frame for ranging and/or other purposes (e.g., "Otherwise"). Similarly, a subscribe SDF frame may include differing attributes as compared to a follow-up SDF and/or the various publish SDF frames. Thus, as a further example, various configurations of a NAN attribute may be used to transport information associated with embodiments disclosed herein.

As yet a further example, as illustrated by FIG. 4D, an action frame format (e.g., as specified by NAN 2.0 and later versions of NAN) may include one or more fields, including a category field, an action field, an OUI field, an OUI type field, an OUI subtype field and/or an information content field. In some embodiments, information associated with embodiments disclosed herein may be transported via the information content field. In some embodiments, information associated with embodiments disclosed herein may be transported via the OUI field, the OUI type field, and/or the OUI subtype field.

Wi-Fi Peer to Peer Communication Protocols

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station with which it is communicating. Further, a wireless station may negotiate a common discovery window for exchange of synchronization packets to help ensure the devices that are communicating directly with each other are properly synchronized to enable the communication. Once two wireless stations have the same discovery window, they may exchange synchronization packets to stay synchronized with each other. The wireless stations may also use the discovery window to exchange service discovery frames to convey other information, such as further availability beyond discovery windows.

The NAN protocol initially included two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate. After this, per NAN 2.0, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements, and exchange this further service information. Once the datapath negotiation window has been established and NAN datapath setup has been performed, the wireless stations may perform datapath synchronization to help ensure that the two stations stay synchronized with each other for proper communication. Additionally, datapath resource allocation relates to two peer wireless stations communicating with each other regarding a common time slot and channel for communication. In other words, the two devices communicate with each other regarding which channel they should use and at which time slot, to help ensure proper communication between them. In addition, the two devices communicate with each other regarding which channel and time slot each would prefer to use for future communications between the devices.

NAN 3.0 introduces TCP/IP support for NAN as well as out-of-band (e.g., Bluetooth and/or Bluetooth Low Energy) triggering of NAN discovery. In particular, NAN 3.0 will introduce support of NAN service discovery over lower energy wireless interfaces. Thus, wireless stations will be enabled to advertise and/or seek NAN services over the lower energy wireless interfaces. NAN 4.0 will further introduce near field communication (NFC) triggering for NAN. Embodiments described herein further define methods (and/or mechanisms) for a wireless station (including, but not limited to, a NAN device) to perform close field communications with a neighboring wireless station.

Close Field Device-to-Device Communications

In some existing implementations, near field communication triggered NAN communication may enable many close field (e.g., approximately 1 meter or less between peer devices) Wi-Fi device-to-device communication applications. In some applications, it may be desirable for a "tap-and-go" user experience. Note that a "tap-and-go" user experience may imply an application (e.g., such as a NAN application) needing to complete an entire transaction within approximately one to two seconds, including triggering (e.g., after an NFC trigger or other OOB triggering mechanism). In addition, some applications may require (nearly) instant transmission of a large amount of data, e.g., in a mobile driver's license (or credential) use case, a mobile device may be expected to deliver up to 2 megabytes of data to a reader (e.g., an NFC reader) in less than one second.

Figure 5:
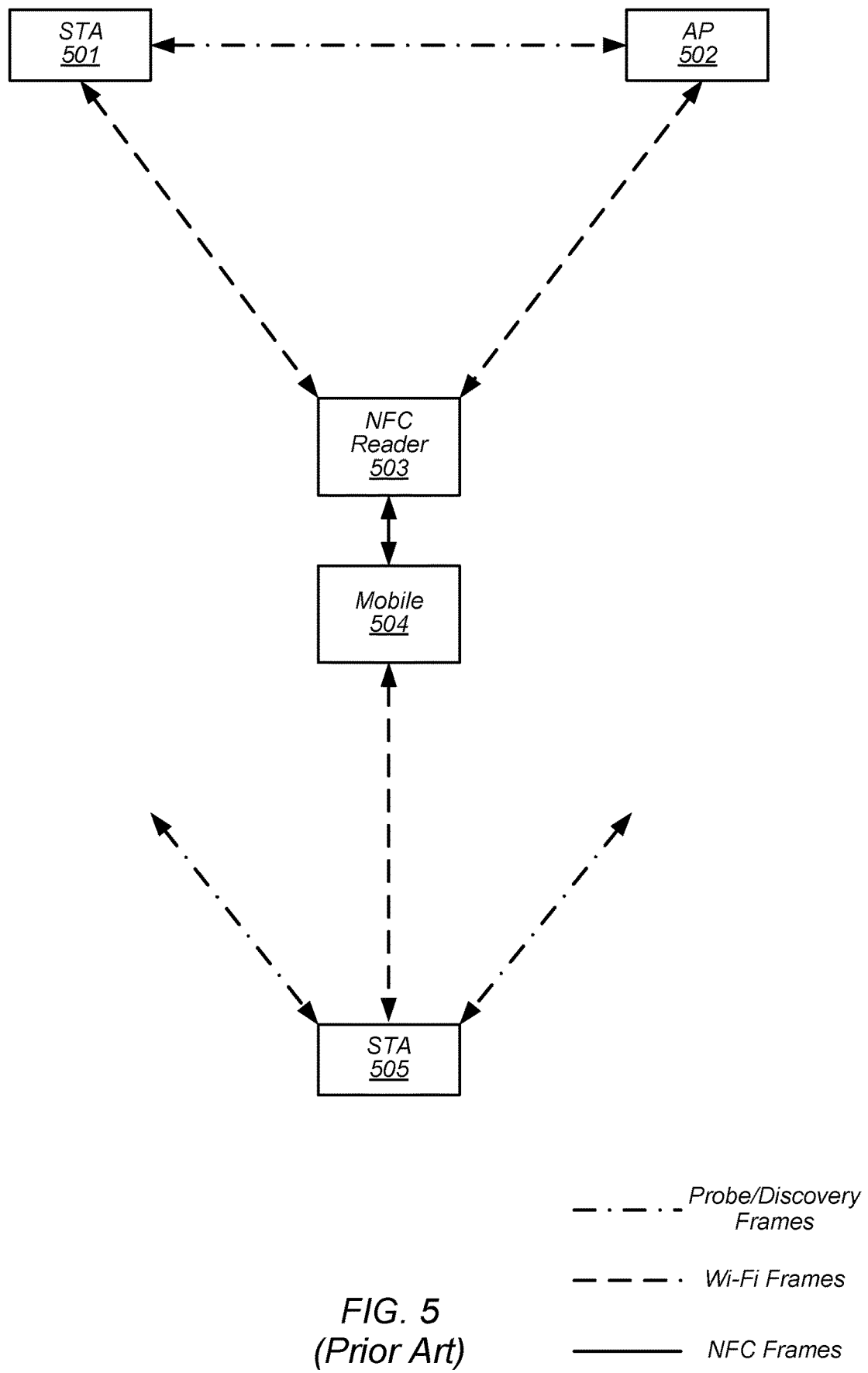
FIG. 5 illustrates an example of far-field and near-field communication between devices.

However, current IEEE 802.11 Wi-Fi implementations use Enhanced Distributed Channel Access (EDCA) to ensure fair access of the unlicensed spectrum resources. EDCA is a Listen Before Talk (LBT) scheme in which the "listen" (or clear channel assessment (CCA)) thresholds are −62 dBm for energy detection and −82 dBm for preamble detection. Further, most Wi-Fi devices, including both access points and wireless stations, use relatively high transmission powers (e.g., in the 15 dBm to 23 dBm range) to ensure sufficient coverage and reachability. In addition, for close-field (e.g., approximately 1 meter or less) communication, the relatively high transmission powers used by most Wi-Fi devices do not impact reachability or data rate; instead, the relatively high transmission powers cause unnecessary interference to other devices, especially to far-field (e.g., greater than 1 meter away) devices within reception range (e.g., far-field neighborhood), e.g., as illustrated by FIG. 5. As shown, mobile device 504 may be attempting an NFC communication with an NFC reader 503. However, NCF reader 503 may be involved in Wi-Fi communications (e.g., in the 15 dBm to 23 dBm range) with access point 502 and station 501. Further, mobile device 504 may be involved in a Wi-Fi peer-to-peer communication with station 505, which may also be broadcasting Wi-Fi probe and/or discovery beacons. Such communications from the devices in the far-field neighborhood (e.g., stations 501 and 505 and access point 502) of close-field devices (e.g., NFC reader 503 and mobile 504) using the relatively high transmission powers may cause un-harmful, but blocking interference to the close field devices. In many instances, a −62 dBm or higher interference may not cause significant impact to a close field communication, however the presence of the interfering signal may block (e.g., delay or prevent) close field communications based on existing EDCA rules.

Figure 6:
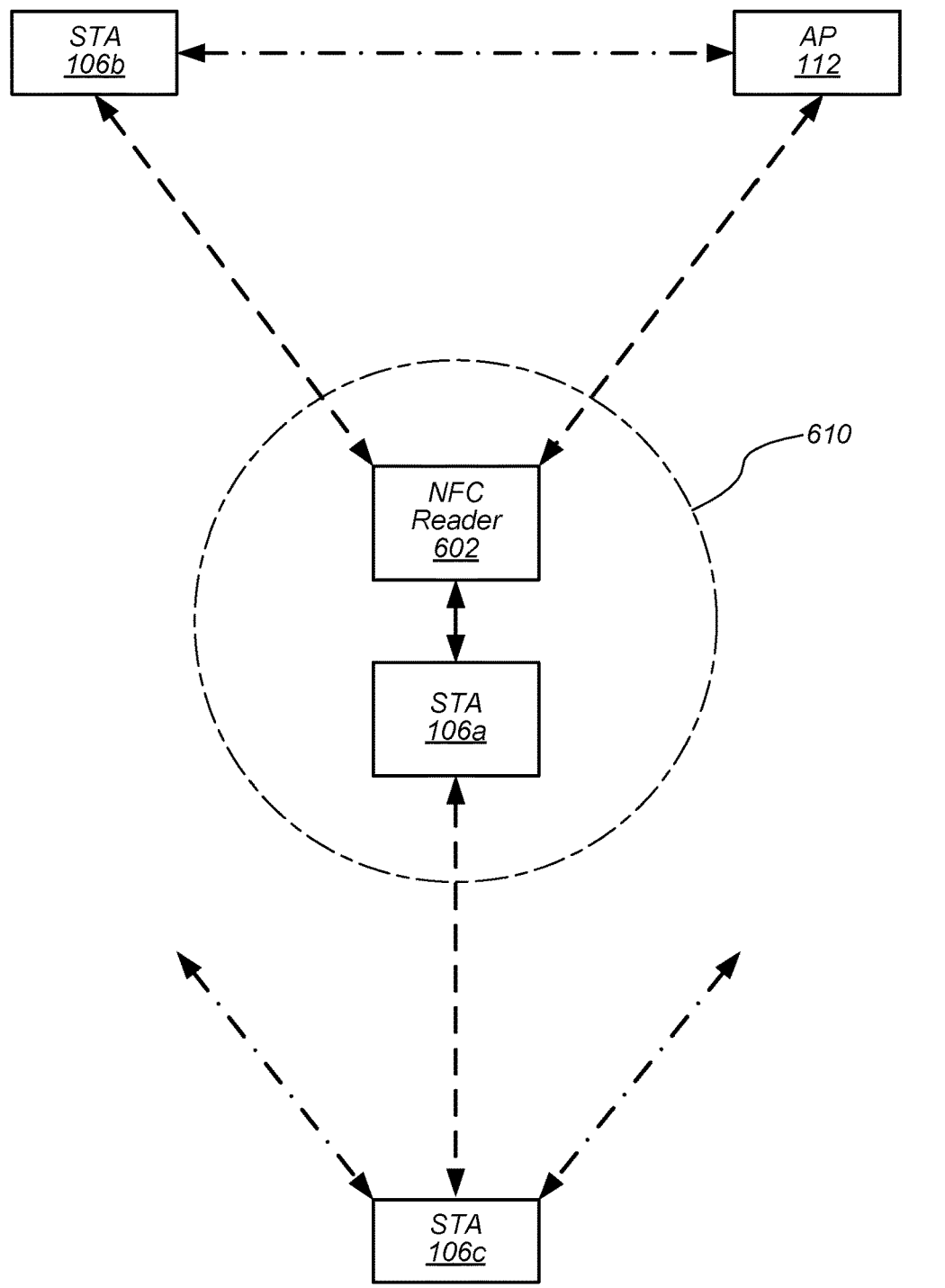
FIG. 6 illustrates an example of far-field and near-field communication between devices, according to some embodiments.

Embodiments described herein implement mechanisms to reduce close-field communication transmission power and/or de-sense unharmful interference from far-field devices to improve close-field communications. For example, as illustrated by FIG. 6, devices (e.g., NFC reader 602 and client station 106a) within a near-field range (e.g., near-field 610) may reduce transmission power for device-to-device communications (e.g., NFC frames) while ignoring unharmful interference (e.g., higher power transmissions such as probe/discovery frames and/or Wi-Fi frames)) from far-field devices (e.g., client stations 106b and 106c and/or AP 112). In some embodiments, the reduction in transmission power may contain interference within a short-range such that interference does not block communications among far-field devices. In addition, de-sensing or ignoring unharmful interference from higher power transmissions of far-field devices may avoid unnecessary blocking (e.g., due to contention rules) at the devices in the near-field 610.

Additionally, as by FIG. 7A, for a 5 GHz band, path loss between near-field devices may be approximately 40 to 47 dB. Thus, at a transmit power of 0 dBm, a signal to noise ratio (SNR) may be in the range of 15 to 22 dB if the maximum interference is approximately −62 dBm. Similarly, at a transmit power of 5 dBm, an SNR may be in the range of 25 to 32 dB if the maximum interference is approximately −67 dBm. Further, as illustrated by FIG. 7B, a 0 dBm transmit power with −62 dBm maximum interference level may allow for data rates (e.g., depending on factors such as frequency band, very high throughput (VHT) modulation and coding set (MCS) index, and a number of spatial streams) in the range of approximately 40 to 390 megabits per second and a 5 dBm transmit power with −67 dBm maximum interference levels may allow for data rates (e.g., depending on factors such as frequency band, VHT MCS index, and a number of spatial streams) in the range of approximately 65 to 650 megabits per second. In some embodiments, such rates may meet requirements for a majority of close field communication applications.

In some embodiments, multiple close-field communication (CFC) transmission modes may be defined based, at least in part, on a CCA threshold for pre-amble detection (PD). As shown by FIG. 7C, a CFC low-power (LP) transmission mode may be used when a CCA threshold for PD is less than −62 dBm. Additionally, a CFC medium-power (MP) transmission mode may be used when a CCA threshold for PD is less than −67 dBm. Further, a CFC high-power (HP) transmission mode may be used when a CCA threshold for PD is less than −72 dBm. In addition, a normal transmission mode may be used when a CCA threshold for PD is less than −82 dBm. In some embodiments, a CFC LP transmission mode transmission power may be 0 dBm, a CFC MP transmission mode transmission power may be 5 dBm, a CFC HP transmission mode transmission power may be 10 dBm, and a normal transmission mode transmission power may be between 15 and 23 dBm. Note however that these values are exemplary only, and other values may be used such that the CFC LP transmission mode has a lower transmission power than the CFC MP transmission mode, which has a lower transmission power than the CFC HP transmission mode, which has a lower transmission power than a normal transmission mode. In addition, in some embodiments, fewer or more transmission power modes may be used, e.g., a lower-power and a higher-power transmission mode.

In some embodiments, device-to-device discovery and/or close-field communication assessment may be accelerated by either device, e.g., as illustrated by FIG. 8. As shown, to accelerate initial discovery and/or CFC assessment, a device (e.g., client station (STA) 106a) may transmit multiple (NAN) discovery beacons 802 and 804 consecutively. In some embodiments, some of the discovery beacons may use different CFC transmission modes (e.g., CFC LP transmission mode, CFC MP transmission mode, CFC HP transmission mode, normal transmission mode). In some embodiments, a discovery beacon may include an indication of the CFC transmission mode. Each device may then evaluate and/or continue (or keep) evaluating maximum and/or average interference levels on a discovery channel (e.g., used to transmit the discovery beacons) as well as received signal strength indicators (RSSIs) of received discovery beacons. In some embodiments, upon receipt of one or more discovery beacons, a device may (substantially) immediately transmit a unicast service discovery frame (SDF) (e.g., messaging 806) using a highest transmission power allowed by current interference level. In some embodiments, if an acknowledgement of an SDF (e.g., messages 808 and 810) is not received, a device may re-transmit the SDF using a transmission mode (e.g., messaging 812) with higher transmission power. Note that in some embodiments, a device may be required to wait until a channel CCA allows a higher power transmission mode. In some embodiments, based on the CFC assessment during device-to-device discovery, the device pair may decide, negotiate, and/or recommend CFC transmission modes for datapath communications (e.g., messaging 814).

Figure 9:
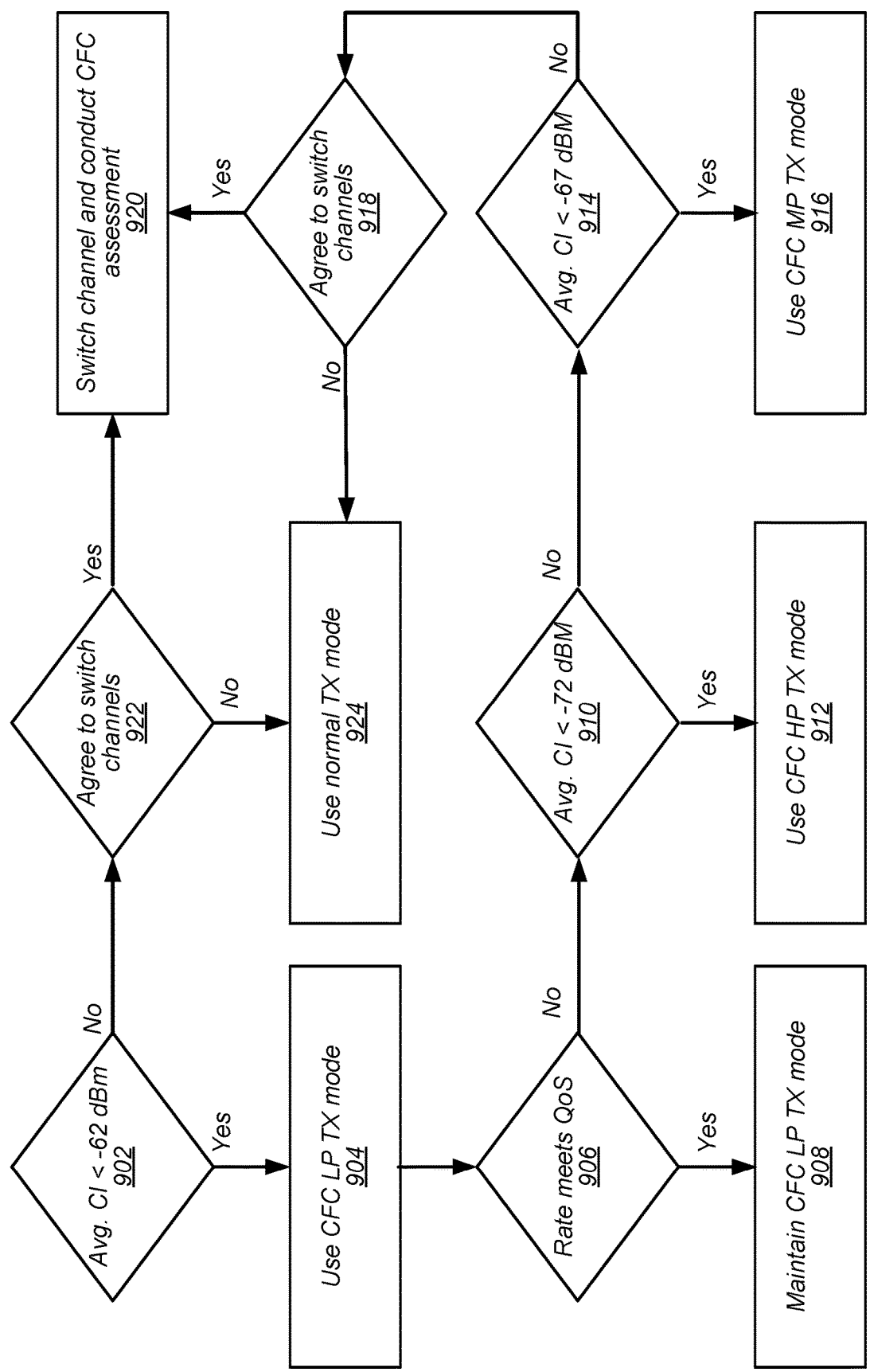
FIG. 9 illustrates a block diagram of an example of a method for CFC transmission mode selection for datapath communications, according to some embodiments.

FIG. 9 illustrates a block diagram of an example of a method for CFC transmission mode selection for datapath communications, according to some embodiments. The method shown in FIG. 9 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 902, a device (e.g., such as client stations 106*a-b*) may initially determine whether an average channel interference is less than a first threshold (e.g., such as −62 dBm). At 904, in response to determining that the average channel interference is less than the first threshold, the device may use a clear-field communication (CFC) low power (LP) transmission mode and apply a rate adaptation algorithm to achieve a highest possible data rate. At 906, the device may determine whether the highest possible data rate meets service requirements for the datapath. At 908, in response to determining that the highest possible data rate meets the service requirements for the datapath, the device may maintain the CFC LP transmission mode for the datapath (e.g., until completion of the transaction).

However, at 910, in response to determining that the highest possible data rate does not meet the service requirements for the datapath, the device may determine whether the average channel interference is less than a second threshold (e.g., such as −72 dBm). At 912, in response to determining that the average channel interference is less than the second threshold, the device may use a CFC high power (HP) transmission mode and apply a rate adaptation algorithm to achieve a highest possible data rate. In addition, the device may maintain the CFC HP transmission mode for the datapath (e.g., until completion of the transaction). Alternatively, at 914, in response to determining that the average channel interference is not less than the second threshold, the device may then determine if the average channel interference is less than a third threshold (e.g., between the first and second threshold, such as −67 dBm). Further, at 916, in response to determining that the average channel interference is less than the third threshold, the device may use a CFC medium power (MP) transmission mode and apply a rate adaptation algorithm to achieve a highest possible data rate. In addition, the device may maintain the CFC MP transmission mode for the datapath (e.g., until completion of the transaction).

Alternatively, at 918, in response to determining that the average channel interference is not less than the third threshold, the device may request to use a different channel for a remainder of the communication (or transaction) and, if accepted by the peer device, at 920, apply a rate adaptation algorithm to achieve a highest possible data rate.

Returning to 902, in response to determining that the average channel interference is not less than the first threshold, at 922, the device may request to use a different channel for discovery. If the devices agree to use a different channel, the devices may switch to the different channel and the process may restart (e.g., with CFC assessment) at 920. However, if the devices cannot agree to use a different channel, at 924, the devices may use a standard (or normal, relative to IEEE 802.11) transmission power and standard CCA thresholds and apply a rate adaptation algorithm to achieve a highest possible data rate.

Figure 10:
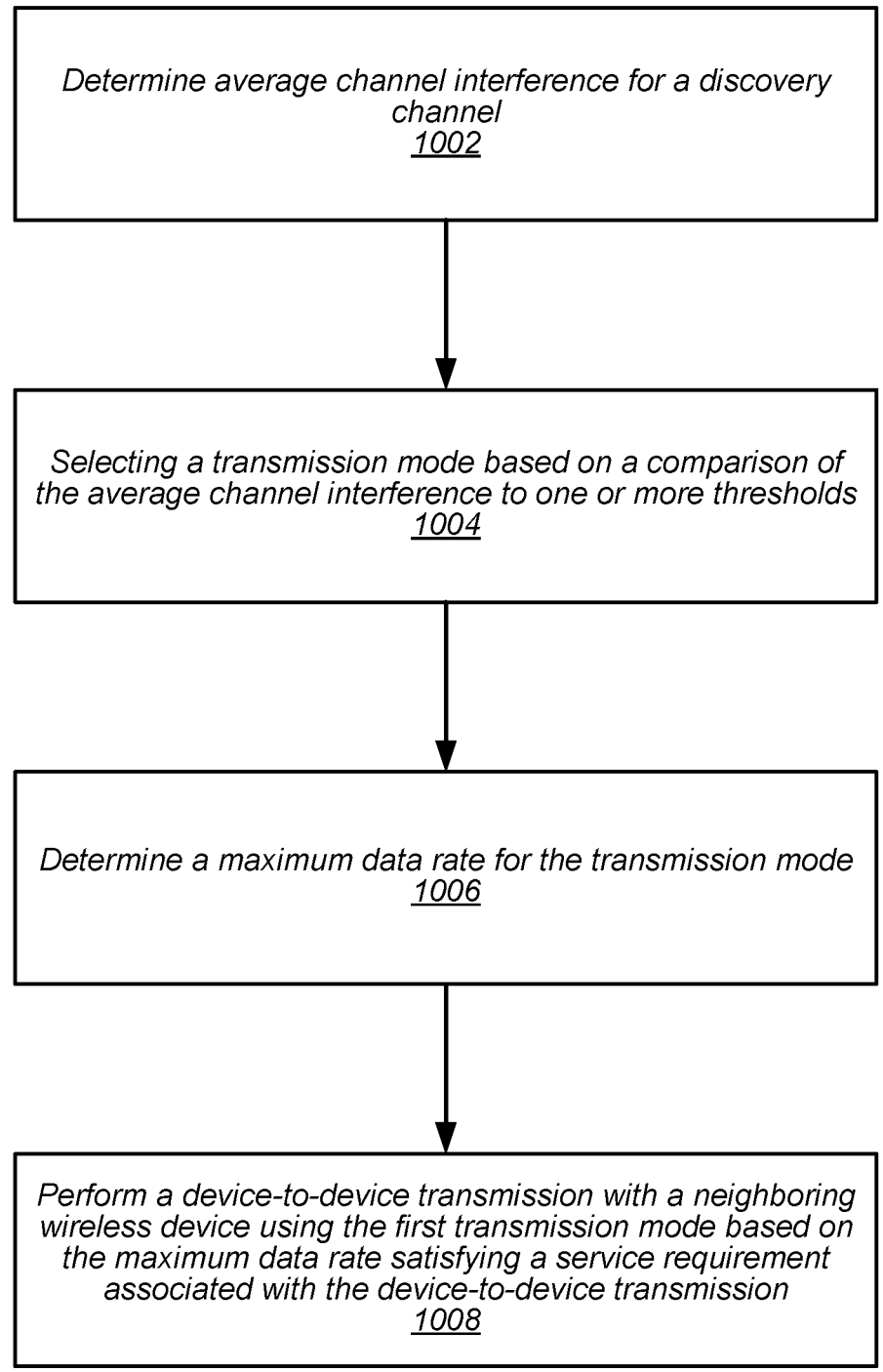
FIG. 10 illustrates a block diagram of an example of a method for transmission mode selection for datapath communications, according to some embodiments.

FIG. 10 illustrates a block diagram of an example of a method for transmission mode selection for datapath communications, according to some embodiments. The method shown in FIG. 10 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1002, a device, such as client station 106, may determine an average channel interference for a discovery channel. In some embodiments, the discovery channel may be associated with a near-field device-to-device communication. In some embodiments, the average channel interference may be based, at least in part, on signals received from neighboring devices. In some embodiments, a near-field device-to-device communication may be a device-to-device communication in which devices involved in the device-to-device communication may be within a physical proximity of 1 meter or less.

At 1004, the device may select a transmission mode based, at least in part, on a comparison of the average channel interference to one or more thresholds. In some embodiments, the selected transmission mode may be one of a plurality of available transmission modes. In some embodiments, the selected transmission mode may be a transmission mode associated with a lowest available transmission power.

At 1006, the device may determine a maximum data rate for the selected transmission mode. In some embodiments, the maximum data rate may be based on one or more factors, such as VHT MCS index, a number of available spatial streams, a transmission frequency, and so forth.

At 1008, the device may perform a device-to-device transmission with a neighboring wireless device using the selected first transmission mode based, at least in part, on the maximum data rate satisfying a service requirement associated with the device-to-device transmission. In some embodiments, the service requirement may be a quality of service (QoS) requirement.

In some embodiments, based, at least in part, on when the maximum data rate not satisfy the quality of service requirement, the device may compare the average channel interference to a second threshold. In such embodiments, the device may select a second transmission mode based, at least in part, on the average channel interference satisfying the second threshold. The second transmission mode may be associated with a second power level. In some embodiments, the second power level may be greater than the first power level. In some embodiments, the device-to-device transmission with the neighboring wireless device may be performed using the second transmission mode.

In some embodiments, based, at least in part, on the average channel interference not satisfying the second threshold, the device may compare the average channel interference to a third threshold. In such embodiments, the device may select a third transmission mode based, at least in part, on the average channel interference satisfying the third threshold. In some embodiments, the third transmission mode associated with a third power level. In some embodiments, the third power level may be between the first power level and the second power level.

In some embodiments, based, at least in part, on the average channel interference not satisfying the third threshold, the device may request, to the neighboring wireless device, to use a second discovery channel for the device-to-device transmissions. In some embodiments, the device may negotiate the second discovery channel with the neighboring wireless device. Additionally, based, at least in part, on the negotiation failing, the device may use a fourth transmission mode for the device-to-device transmissions. In some embodiments, the fourth transmission mode may be associated with a fourth power level. In some embodiments, the fourth power level may greater than the second power level.

In some embodiments, in response to detecting an out-of-band triggering event, the device may transmit a plurality of (consecutive) discovery beacons to the neighboring wireless device. In some embodiments, each (consecutive) discovery beacon of the plurality of (consecutive) discovery beacons may be transmitted at a respective power level. In some embodiments, a first discovery beacon of the plurality of (consecutive) discovery beacons may be transmitted at the first power level. In some embodiments, the respective power level may increase with each consecutive discovery beacon transmitted, starting from the first power level and increasing to a maximum power level. In some embodiments, each discovery beacon of the plurality of discovery beacons may include an indication of the respective power level.

In some embodiments, the device may receive a plurality of discovery beacons from the neighboring wireless device. In some embodiments, each discovery beacon of the plurality of discovery beacons may be transmitted at a respective power level. In some embodiments, a first discovery beacon of the plurality of discovery beacons may be transmitted at the first power level. In some embodiments, each discovery beacon of the plurality of discovery beacons may include an indication of the respective power level. In some embodiments, determining the average channel interference may include evaluating a maximum and/or average interference for each received discovery beacon and determining received signal strength indicators for each received discovery beacon.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
at least one antenna;
one or more wireless interfaces in communication with the at least one antenna; and
at least one processor in communication with the one or more wireless interfaces;
wherein the at least one processor is configured to cause the wireless station to:
determine, for a first discovery channel, an average channel interference;
select, when the average channel interference is less than a first threshold, a first transmission mode having an associated first power level;
determine a maximum data rate for the first transmission mode;
perform, when the maximum data rate satisfies a quality of service requirement for a device-to-device transmission, a device-to-device transmission with a neighboring wireless device using the first transmission mode; and
in response to detecting an out-of-band triggering event, transmit a plurality of consecutive discovery beacons to the neighboring wireless device, wherein each consecutive discovery beacon of the plurality of consecutive discovery beacons is transmitted at a respective power level.

2. The wireless station of claim 1,
wherein the at least one processor is further configured to cause the wireless station to:
compare, when the maximum data rate does not satisfy the quality of service requirement, the average channel interference to a second threshold; and
select, when the average channel interference satisfies the second threshold, a second transmission mode having an associated second power level, wherein the second power level is greater than the first power level.

3. The wireless station of claim 2,
wherein the at least one processor is further configured to cause the wireless station to:
perform the device-to-device transmission with the neighboring wireless device using the second transmission mode.

4. The wireless station of claim 2,
wherein the at least one processor is further configured to cause the wireless station to:
compare, when the average channel interference does not satisfy the second threshold, the average channel interference to a third threshold; and
select, when the average channel interference satisfies the third threshold, a third transmission mode having an associated third power level, wherein the third power level is greater than the first power level and less than the second power level.

5. The wireless station of claim 4,
wherein the at least one processor is further configured to cause the wireless station to:
when the average channel interference does not satisfy the third threshold, request the neighboring wireless device to use a second discovery channel for the device-to-device transmissions.

6. The wireless station of claim 1,
wherein the at least one processor is further configured to cause the wireless station to:
in response to determining that the average channel interference does not satisfy the first threshold, request the neighboring wireless device to use a different discovery channel for the device-to-device transmissions.

7. The wireless station of claim 1,
wherein the respective power level increases with each consecutive discovery beacon transmitted, starting from the first power level and increasing to a maximum power level.

8. The wireless station of claim 1,
wherein each consecutive discovery beacon includes an indication of the respective power level used for transmission.

9. A non-transitory computer readable memory medium storing program instructions executable by processing circuitry of a wireless device to:
determine an average channel interference for a first discovery channel;
compare the average channel interference to a first threshold;
in response to determining that the average channel interference is less than the first threshold, select a first transmission mode having an associated first power level;
determine a maximum data rate for the first transmission mode;
compare the maximum data rate to a quality of service requirement for a device-to-device transmission with a neighboring wireless device;
perform, when the maximum data rate satisfies the quality of service requirement, a device-to-device transmission with the neighboring wireless device using the first transmission mode; and
in response to detecting an out-of-band triggering event, transmit a plurality of consecutive discovery beacons to the neighboring wireless device, wherein each consecutive discovery beacon of the plurality of consecutive discovery beacons is transmitted at a respective power level.

10. The non-transitory computer readable memory medium of claim 9,
wherein a first discovery beacon of the plurality of discovery beacons is transmitted at the first power level.

11. The non-transitory computer readable memory medium of claim 10,
wherein each discovery beacon of the plurality of discovery beacons includes an indication of the respective power level.

12. The non-transitory computer readable memory medium of claim 9,
wherein the program instructions are further executable to cause the wireless device to:
receive a plurality of discovery beacons from the neighboring wireless device, wherein each discovery beacon of the plurality of discovery beacons is transmitted at a respective power level.

13. The non-transitory computer readable memory medium of claim 12,
wherein, to determine the average channel interference, the program instructions are further executable to cause the wireless device to:
evaluate at least one of a maximum interference or an average interference for each received discovery beacon; and
determine a received signal strength indicator for each received discovery beacon.

14. The non-transitory computer readable memory medium of claim 9,
wherein the program instructions are further executable to cause the wireless device to:
in response to determining that the maximum data rate does not meet the service requirements, compare the average channel interference to a second threshold; and
in response to determining that the average channel interference is less than the second threshold, select a second transmission mode having an associated second power level, wherein the second power level is greater than the first power level; and
perform a device-to-device transmission with the neighboring wireless device using the second transmission mode.

15. An apparatus, comprising:
a memory; and
at least one processor in communication with the memory, wherein the at least one processor is configured to:
select a transmission mode having an associated power level based, at least in part, on an average channel interference corresponding to a device-to-device discovery channel;
determine a maximum data rate for the transmission mode;
perform, when the maximum data rate satisfies a quality of service requirement for near-field device-to-device transmissions, a near-field device-to-device transmission with a neighboring wireless device using the transmission mode; and
in response to detecting an out-of-band triggering event, transmit a plurality of consecutive discovery beacons to the neighboring wireless device, wherein each consecutive discovery beacon of the plurality of consecutive discovery beacons is transmitted at a respective power level.

16. The apparatus of claim 15,
wherein, to select the transmission mode, the at least one processor is further configured to:
compare the average channel interference corresponding to the device-to-device discovery channel to one or more thresholds, wherein, when the average channel interference is less than a first threshold, a first transmission mode is selected, wherein, when the average channel interference is greater than a second threshold, a second transmission mode is selected, and wherein the average channel interference is between the first and second thresholds, a third transmission mode is selected.

17. The apparatus of claim 16,
wherein the first transmission mode is associated with a first power level, wherein the second transmission mode is associated with a second power level different from the first power level, and wherein the third transmission mode is associated with a third power level different from the second power level.

18. The apparatus of claim 17,
wherein the second power level is greater than the first power level, and wherein the third power level is between the first power level and the second power level.

19. The apparatus of claim 15,
wherein near-field device-to-device transmission comprises transmission between devices that are within a physical proximity of 1 meter.

20. The apparatus of claim 15,
wherein the respective power level increases with each consecutive discovery beacon transmitted, starting from the power level and increasing to a maximum power level.

* * * * *